US011172219B2

(12) United States Patent
Dubey et al.

(10) Patent No.: US 11,172,219 B2
(45) Date of Patent: Nov. 9, 2021

(54) ALTERNATING FRAME PROCESSING OPERATION WITH PREDICTED FRAME COMPARISONS FOR HIGH SAFETY LEVEL USE

(71) Applicant: TEXAS INSTRUMENTS INCORPORATED, Dallas, TX (US)

(72) Inventors: Aishwarya Dubey, Plano, TX (US); Shashank Dabral, Allen, TX (US); Veeramanikandan Raju, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/866,647

(22) Filed: May 5, 2020

(65) Prior Publication Data

US 2021/0203979 A1 Jul. 1, 2021

Related U.S. Application Data

(60) Provisional application No. 62/955,095, filed on Dec. 30, 2019.

(51) Int. Cl.
*H04N 19/557* (2014.01)
*H04N 19/577* (2014.01)
(Continued)

(52) U.S. Cl.
CPC ............ *H04N 19/557* (2014.11); *G01S 17/86* (2020.01); *G01S 17/89* (2013.01); *H04N 19/567* (2014.11); *H04N 19/577* (2014.11)

(58) Field of Classification Search
CPC .. H04N 19/557; H04N 19/577; H04N 19/567; G01S 17/86; G01S 17/89

(Continued)

(56) References Cited

U.S. PATENT DOCUMENTS 5,307,136 A * 4/1994 Saneyoshi ............ H04N 13/243
356/3.14
2015/0035984 A1 * 2/2015 Otsuka ................. H04N 5/2329
348/148

(Continued)

FOREIGN PATENT DOCUMENTS

CN 102281441 B 5/2017

OTHER PUBLICATIONS

International Search Report for PCT/US2020/066539 dated Mar. 18, 2021.

*Primary Examiner* — Tung T Vo
(74) *Attorney, Agent, or Firm* — Brian D. Graham; Charles A. Brill; Frank D. Cimino

(57) ABSTRACT

Frames from an image stream or streams are processed by independently operating digital signal processors (DSPs), with only frame checking microprocessors operating in a lockstep mode. In one example, two DSP are operating on alternate frames. Each DSP processes the frames and produces prediction values for the next frame. The lockstep microprocessors develop their own next frame prediction. The lockstep processors compare issued frames and previously developed predicted frames for consistency. If the predictions are close enough, the issued frame passes the test. The lockstep processors then compare the issued frame to the preceding two frames for a similar consistency check. If the prior frames are also close enough, the issued frame is acceptable. In another example, hardware checkers are provided to compare the present frame with a larger number of prior frames. The hardware checkers provide comparison results to the lockstep processors to compare against allowable variation limits.

20 Claims, 15 Drawing Sheets

(51) Int. Cl.
*G01S 17/89* (2020.01)
*G01S 17/86* (2020.01)
*H04N 19/567* (2014.01)

(58) Field of Classification Search
USPC ......................................................... 348/148
See application file for complete search history.

(56) References Cited

U.S. PATENT DOCUMENTS

2016/0344916 A1\* 11/2016 Murao ................. H04N 5/2353
2018/0091847 A1    3/2018 Wu et al.
2018/0288320 A1\* 10/2018 Melick .................... G01S 17/86
2019/0012763 A1\*  1/2019 Kobayashi ................ G06T 1/20
2019/0141070 A1\*  5/2019 Tsurumi ............. H04L 63/1425
2019/0313111 A1   10/2019 Varadarajan et al.
2019/0340496 A1\* 11/2019 Kim .................... G06N 3/0454

\* cited by examiner

ALTERNATING FRAME PROCESSING OPERATION WITH PREDICTED FRAME COMPARISONS FOR HIGH SAFETY LEVEL USE

CROSS-REFERENCE TO RELATED APPLICATIONS

This application claims priority from U.S. Provisional Application No. 62/955,095, filed on Dec. 30, 2019, which is hereby incorporated by reference.

BACKGROUND

1. Field

The field relates to fault detection in image processing operations.

2. Description of the Related Art

Electronics use in automobiles is increasing daily. In addition to the conventional engine controller, transmission controller, infotainment unit, body controller and the like, the advent of numerous safety and autonomous systems are greatly increasing the processing done inside an automobile. For example, adaptive cruise control uses the intercommunication between a radar system, an engine controller and a transmission controller. As another example, in a bird's eye view display, outputs from a number of different cameras arranged at various locations are provided to a processor to process the received video and develop the resultant bird's eye view image, which is then provided to the infotainment system for display to the driver. This increase in the number and type of input sensors places large burdens on the system on a chip (SoC) devices that receive the sensor data. Additionally, the sensor data is often used by multiple processes, increasing the demands on the SoC devices. The burden is further complicated because of the reliability requirements for the safety systems that use the sensor data, which often require duplication, at least, of computational blocks.

SUMMARY

Images or frames from an image stream or streams are processed by independently operating digital signal processors (DSPs) and hardware assist logic, with only frame checking microprocessors operating in a lockstep mode. In one example, two DSPs are operating on an image stream. One DSP is operating on even frames and the other DSP is operating on odd frames, rather than each DSP operating on each frame in lockstep mode. Each DSP processes the frames as needed for the given operation and produces prediction values for the next frame. For example, a DSP is operating on frame and is producing a prediction for frame 2. The lockstep microprocessors develop their own next frame prediction, frame 2 in the example. When the DSP completes frame processing and issues the frame and the next frame prediction, the lockstep processors compare the issued frame and the previously developed predicted frames for consistency. If the predictions are close enough, the issued frame passes the test. The lockstep processors then compare the issued frame to the preceding two frames for a similar consistency check. For example, the lockstep processors would compare frames 0 and to issued frame 2. If the prior frames are also close enough, the issued frame is acceptable, and no errors are raised. If either comparison determines that the frames are too different, then an error indication is provided so that the appropriate safety precautions can be taken.

In another example, frame prediction is not used and hardware checkers are provided to compare the present frame with a larger number of prior frames, such as four prior frames. The hardware checkers provide comparison results to the lockstep processors to compare against allowable variation limits. If the compare result exceeds the variation limits, an error indication is provided.

Because each DSP is no longer processing every frame, just handling only every other frame, and some examples developing the next frame prediction, a significant amount of DSP bandwidth is released for performing other functions besides the specific image processing task. As each frame is being checked multiple ways against a large number of samples, safety has not been reduced at the expense of processing bandwidth. This allows either greater capabilities for a given SoC or the use of a lesser SoC than would otherwise be required.

BRIEF DESCRIPTION OF THE FIGURES

For a detailed description of various examples, reference will now be made to the accompanying drawings in which.

DETAILED DESCRIPTION

Figure 1:
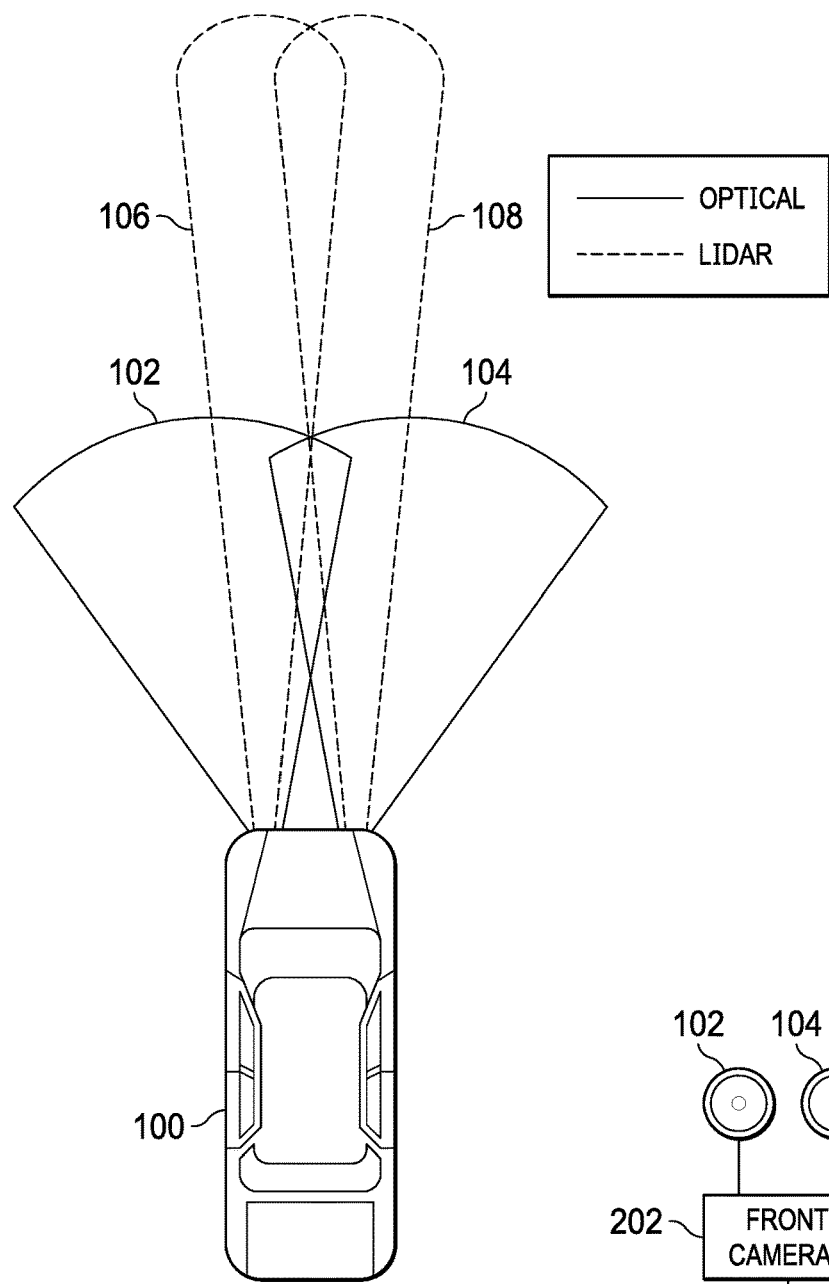
FIG. 1 is a drawing of a vehicle and the fields of view of various sensors.

Referring now to FIG. 1, a vehicle 100 is shown. The vehicle 100 includes a series of cameras or optical sensors. Left camera 102 and right camera 104 provide images from the front of the vehicle 100 for lane departure warnings, traffic sign recognition, collision alert and object detection. Left LIDAR (light detecting and ranging) sensor 106 and a right LIDAR sensor 108 provide images from the front of the vehicle 100 for lane and object detection. These cameras and LIDAR sensors provide the inputs to various advanced driver assistance systems (ADAS). It is understood that cameras and LIDAR sensors are just examples and many other sensors, such as radar and ultrasonic and the like can be used as well.

Figure 2:
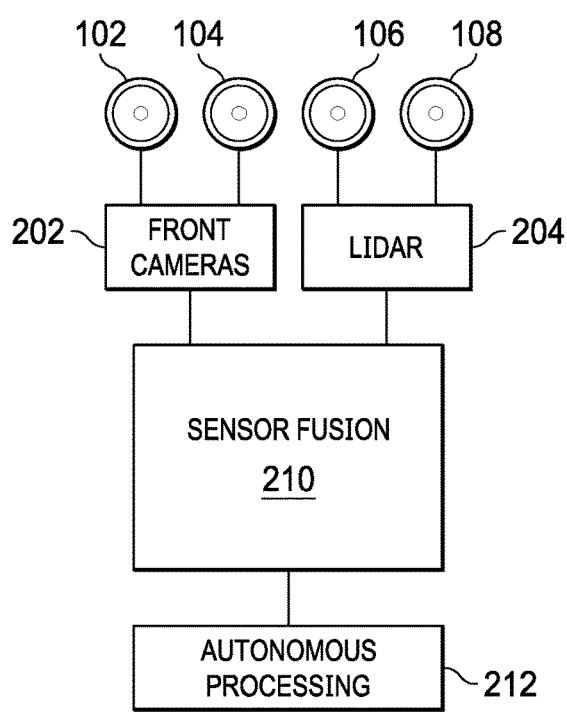
FIG. 2 is a block diagram of the sensor systems in the vehicle of FIG. 1.

Referring now to FIG. 2, cameras 102 and 104 are connected to a front camera module 202. LIDAR sensors 106 and 108 are connected to a LIDAR module 204. The front cameras module 202 and the LIDAR module 204 are connected to a sensor fusion module 210 which integrates the various sensor outputs developed by the other modules. An autonomous processing module 212 is connected to the sensor fusion module 210 to perform autonomous processing for vehicle operation. It is understood that more or fewer sensors can be connected to a given module and multiple sensor types can be provided to a single module.

In automotive applications, safety is a priority in many of the electrical systems. ISO 26262 defined various Automotive Safety Integrity Levels (ASIL). The ASIL level used for a given system is based on severity, probability of exposure, and controllability. Probability of exposure has five classes: "Incredible" to "High probability" (E0-E4). Severity has four classes: "No injuries" to "Life-threatening injuries (survival uncertain), fatal injuries" (S0-S3). Controllability, which means controllability by the driver, not by the vehicle electronic systems, has four classes: "Controllable in general" to "Difficult to control or uncontrollable." These values are combined to produce an ASIL level from A to D, A being the lowest level and D being the highest level. Collision alert, lane departure and autonomous driving generally fall into the ASIL D category.

Figure 3A:
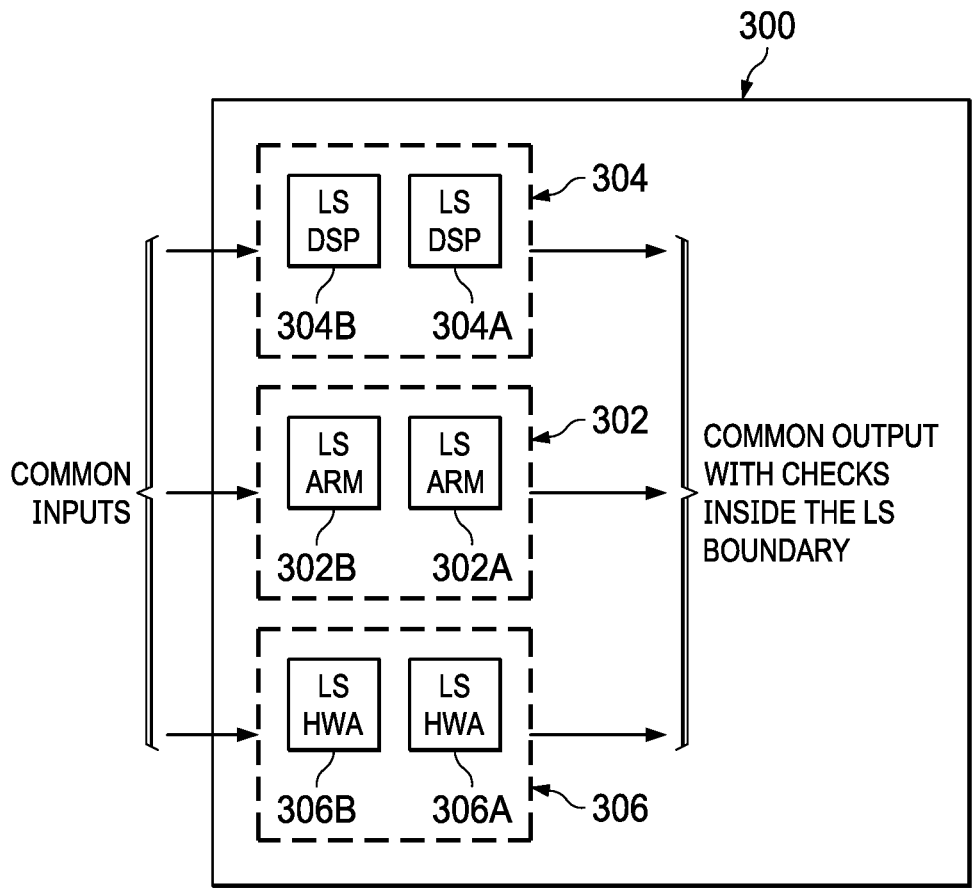
FIG. 3A is a block diagram of a prior SoC operating in ASIL D mode.

FIG. 3A is an illustration of an SoC 300 as used in modules, such as modules 202, 204, 210 or 212, configured for ASIL D operation. Components in the SoC 300 fall into the general classes, processors 302, digital signal processors (DSPs) 304 and hardware assist logic 306. In the SoC 300, the processors 302 are two microprocessors 302A, 302B, such as ARM processors, configured for lockstep operation. In lockstep operation each processor executes identical software and operates on the same input data. Detection hardware monitors the outputs of the microprocessors 302A, 302B for differences and provides an error indication if a difference is detected. Similarly, the DSP 304 includes two DSPs 304A, 304B executing in lockstep. The hardware assist logic 306 has identical hardware assist logic 306A, 306B which operates in lockstep.

While the lockstep operation does achieve ASIL D operation, it does it at the cost of effectively doubling the required silicon area of the SoC, limiting capabilities of the SoC.

Figure 3B:
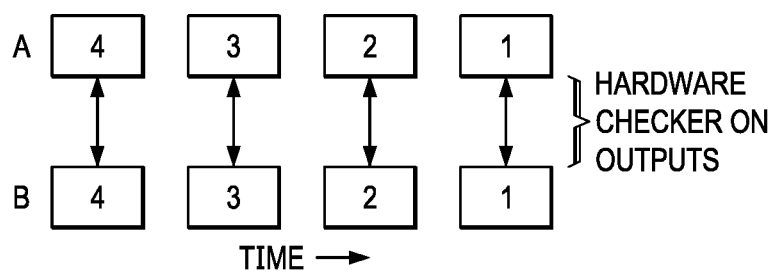
FIG. 3B is a diagram illustrating the frames processed by the SoC of FIG. 3A.

FIG. 3B illustrates that each frame is operated on by each device in each block, such as microprocessors 303A, 302B; DSPs, 304A, 304B and hardware assist logic 306A, 306B. In FIG. 3B, the top row is the frames operated on by the "A" devices, while the bottom row is the frames operated on by the "B" devices. This shows that each frame from each image source is operated on by each device of the lockstep pairs.

Figure 4A:
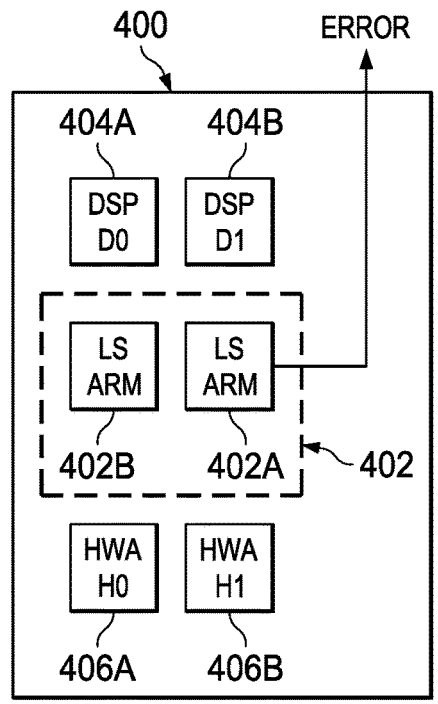
FIG. 4A is one example of an SoC operating in ASIL D mode.

FIG. 4A is a block diagram of a first example of an SoC 400 as can be used in the modules 202, 204, 210 or 212 to form an ASIL D complaint image processing system. In the SoC 400, only the processor 402 is formed by lockstep microprocessors 402A, 402B. The DSPs D0 404A, D1 404B operate independently. The hardware assist logic 406A, 406B operates independently.

Figure 4B:
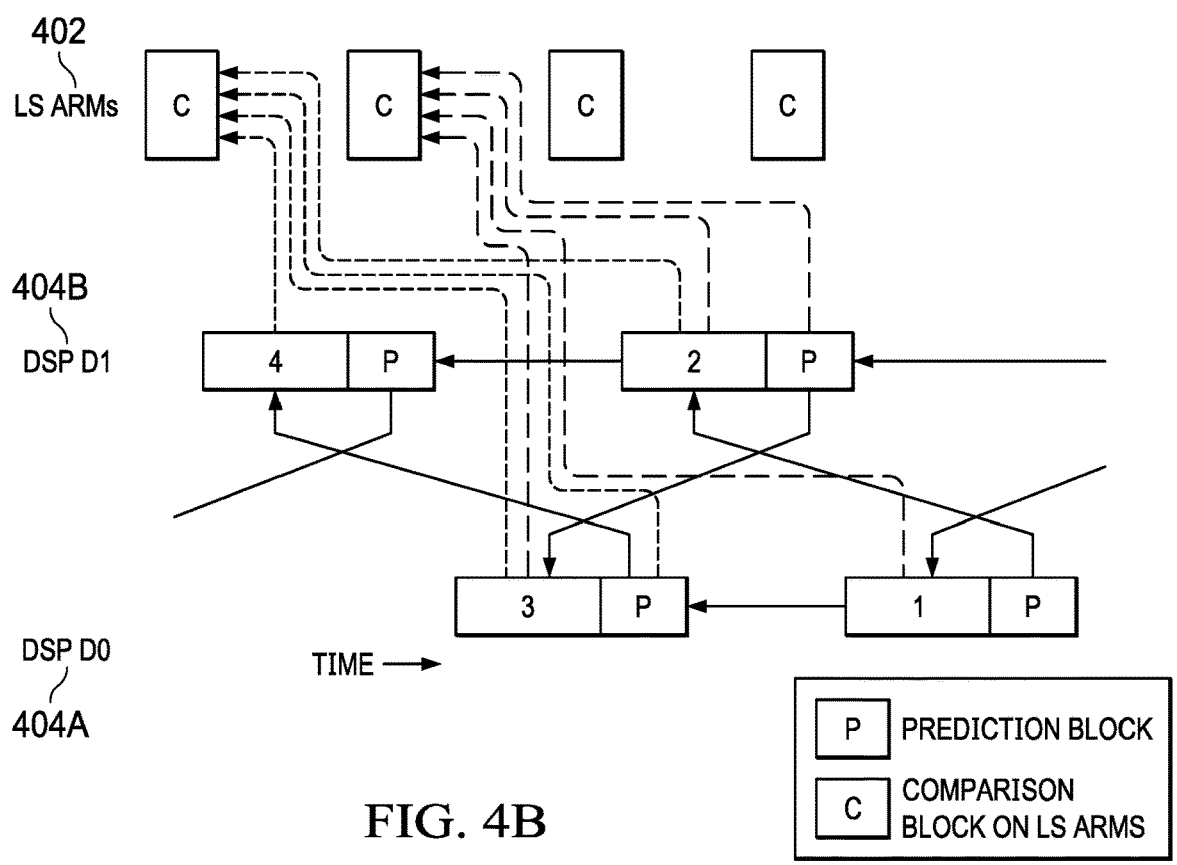
FIG. 4B is a diagram illustrating the frames processed by the SoC of FIG. 4A.

FIG. 4B illustrates basic operation of the SoC 400. In this example, DSP Do 404A operates on just odd frames, while DSP D1 404B operates on just even frames, so that DSP D0 404A and DSP D1 404B operate on different frames. Each DSP D0, D1 404A, 404B provides a prediction of the next frame along with its odd or even frame. The lockstep processors 402 develop their own prediction of the next frame and then compare the predictions made by the DSP and itself to the actual frame and also compares the actual frame to the two prior frames. For example, as shown in FIG. 4B, for frame 3, the lockstep processors 402 use the actual frame 3, the prior frames 2 and 1 and the predictions done with frame 2 to determine if the actual frame 3 is within an acceptable deviation of the prior frame and the predictions. Then for frame 4, the lockstep processors 402 use the actual frame 4, prior frames 3 and 2 and the predictions done with frame 3 to evaluate the actual frame 4. If a frame is outside of the acceptable deviation, then the lockstep processors 402 provide an error signal.

Of note is the gap between successive frames for each DSP D0, D1 404A, 404B. This gap is slightly less than the time required by the DSP to process a frame. The DSP can use this time for other processing tasks, beyond the illustrated frame processing that is being done to conform to ASIL D. Comparing to FIG. 3B, where there is effectively just a nominal gap or time between frames, in FIG. 4B, the gap is appreciable, allowing significant other processing to be performed by the DSPs D0 404A, D1 404B. By operating as shown in FIG. 4B, almost an entire DSP worth of processing has been recovered as compared to FIG. 3B. Understanding that the DSPs may be able to perform the frame operations in less than the nearly 100% duty cycle indicated in FIG. 3B, depending on the actual capabilities of the DSPs, the improvement of FIG. 4B is still just less than the time required to process a frame, which is still an appreciable improvement in the capability to perform other tasks besides frame processing.

Figure 5:
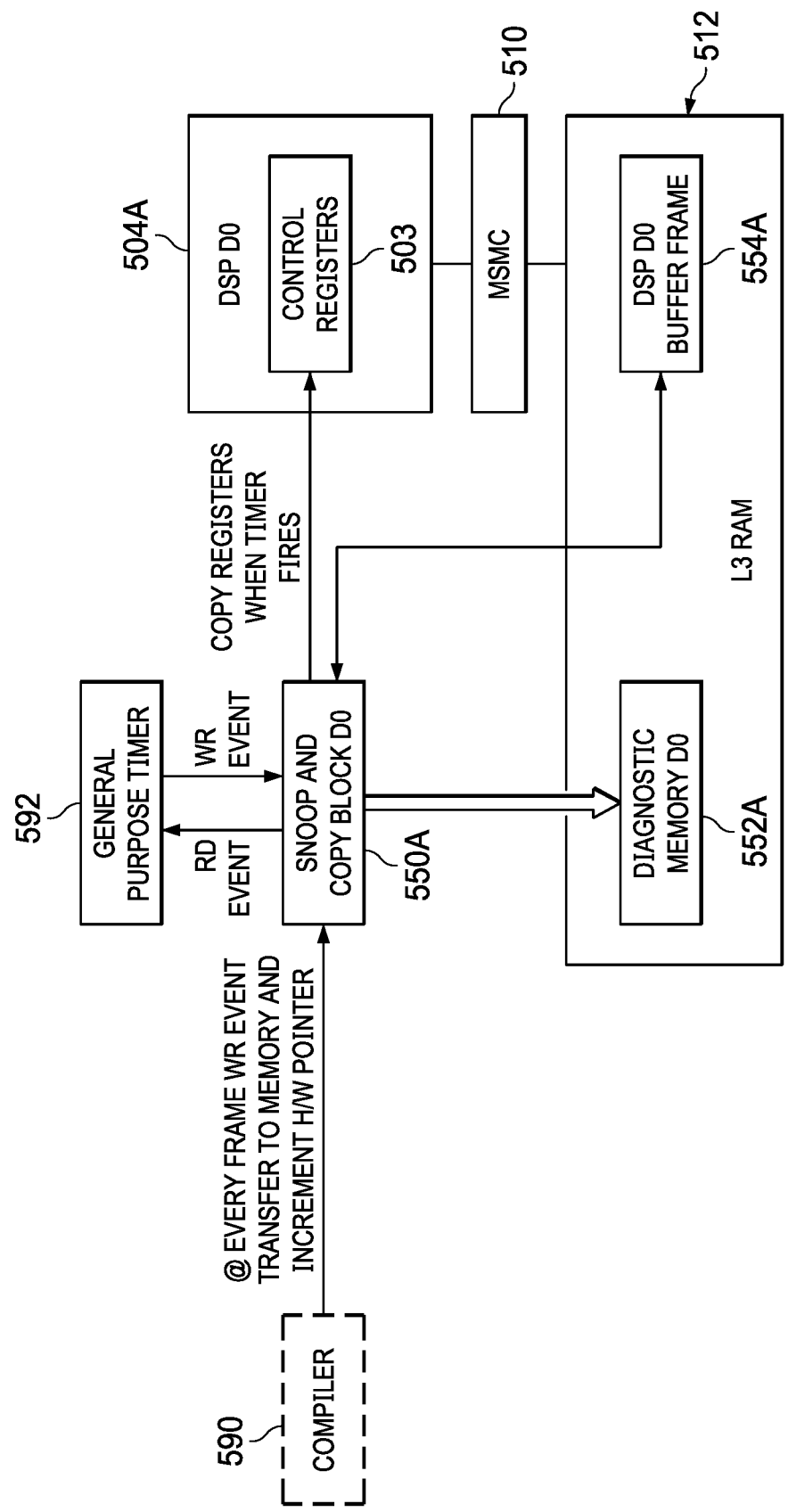
FIG. 5 is a block diagram of one example for obtaining comparison values of the SoC of FIG. 4A.

Referring now to FIG. 5, a DSP D0 504A is illustrated. A series of selected control registers 503 are present in the DSP 504A. The DSP D0 504A is connected to a multicore shared memory controller (MSMC) 510. An L3 RAM 512 is connected to the MSMC 510. A diagnostic memory D0 552A is located in the L3 RAM 512, as is a DSP Do frame buffer 554A, the diagnostic memory D0 552A and DSP Do frame buffer 554A together being considered a data memory area in the L3 RAM 512, as opposed to program memory areas which store instructions or programs executed by the DSP D0 504A and other processors, such as the lockstep processors 402A, 402B. The diagnostic memory Do 552A and the DSP Do frame buffer 554A are located at known locations to simplify operation. The DSP Do frame buffer 554A may include additional scratchpad memory being used by the DSP D0 504A to develop the particular frame of interest. A snoop and copy block 550A is connected to the selected control registers 503 in the DSP D0 504A, to the DSP Do frame buffer 554A, to the diagnostic memory D0 552A and to a general purpose timer 592. The snoop and copy block 550A in one example is a hardware block that performs read and write operations. In another example, the snoop and copy block 550A is a software block where instructions executed by the DSP perform the read and write operations. When the snoop and copy block 550A is operated, the snoop and copy block 550A captures a timestamp from the general purpose timer 592 and copies the values of the selected control registers 503 from the DSP D0 504A and frames from the DSP Do frame buffer 554A to a diagnostic memory 552, thus creating a timestamped snapshot of the of the DSP D0 504A operation.

Two sources trigger the operation of the snoop and copy block 550A. The first source is instructions executing on the DSP D0 504A and the second source is the general purpose timer 592. It is understood that the DSP D0 504A is executing instructions to perform the frame operations. In one example, additional instructions are provided so that upon completion of every frame, these additional instructions executing in the DSP D0 504A trigger the snoop and copy block 550A. This is shown in FIG. 5 by a compiler block 590 connected to the snoop and copy block 550A. The software version of the snoop and copy block 550A is executed, while a register bit or the like is set to trigger the hardware version of the snoop and copy block 550A. This results in a timestamp and the control register values and the DSP frame being placed in the diagnostic memory Do 552A at each frame processing completion. By triggering this snoop and copy operation based on the completion of every frame, the alternating frame, skewed operation of the DSPs is synchronized so that comparisons between the contents of the diagnostic memories D0 552A, D1 552B can more easily be made. In addition, the general purpose timer 592 is configured to trigger write events of the hardware version of the snoop and copy block 550A. Preferably the general purpose timer 592 is configured so that these write events occur at consistent intervals with respect to frame computations, so that the two DSPs can be synchronized. The snoop and copy block 550A captures the timestamp of the general purpose timer 592 and reads the selected control registers 503 and the DSP Do frame buffer 554A, with all values being written to the diagnostic memory D0 552A. In this manner, by capturing the timestamp, the frame information and the control registers after every frame processing completion event and at synchronized write events, the alternating frame operation of the DSPs is effectively synchronized so that comparison operations are simplified.

Figure 5A:
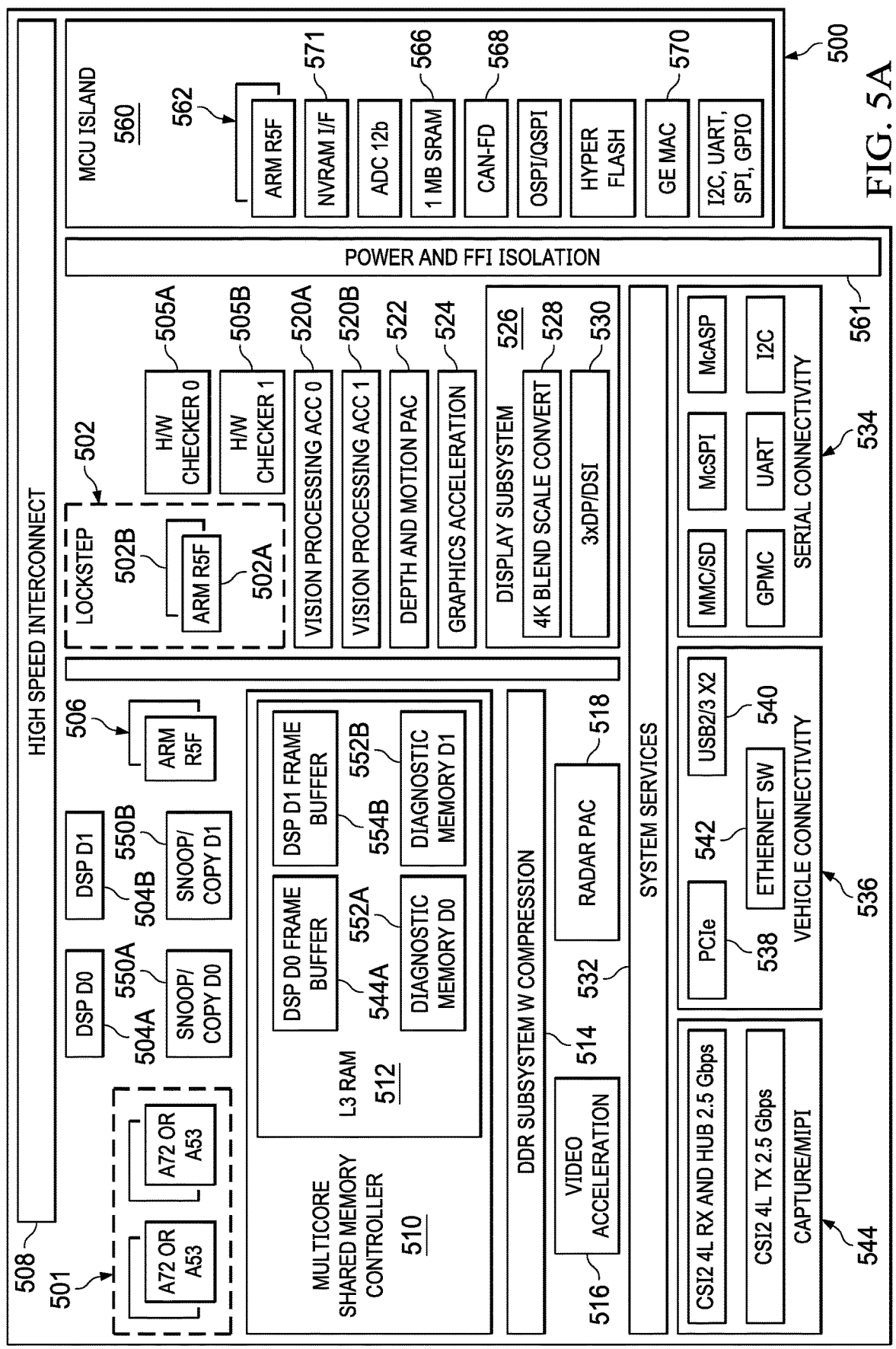
FIG. 5A is a block diagram of an SoC as used FIGS. 4A and 5.

FIG. 5A is a block diagram of a first example of an SoC 500 as can be used as the SoC 400. A series of more powerful microprocessors 501, such as ARM A72 or A53 cores, form the primary general-purpose processing block of the SoC 500. Lockstep processors 502, with individual microprocessors 502A, 502B, such as ARM $R_5F$ cores, are the equivalent to the lockstep processors 402. Two DSPs, DSP0 504A and DSP 1504B are the equivalent to DSPs D0 404A, D1 404B. A simpler microprocessor 506, such as one or more ARM $R_5F$ cores, provides general control capability in the SoC 500. A high-speed interconnect 508 connects the microprocessors 501, lockstep processors 502, DSP 0 504A, DSP 1 504B and microprocessor 506 to various other components in the SoC 500. For example, the multicore shared memory controller 510, which includes onboard memory or L3 RAM 512, is connected to the high-speed interconnect 508 to act as the onboard RAM and controller for the SoC 500. A DDR memory controller system 514 is connected to the high-speed interconnect 508 and acts as an external memory interface to external DRAM memory. A video acceleration module 516 and a radar processing accelerator (PAC) module 518 are similarly connected to the high-speed interconnect 508. Two vision processing accelerator modules 520A, 520B are connected to the high-speed interconnect 508 and are representative of the hardware assist logic 406A, 406B, though it is understood that many of the blocks, combinations of black and blocks not shown came from the hardware assist logic. A depth and motion PAC module 522 is connected to the high-speed interconnect 508. A graphics acceleration module 524 is connected to the high-speed interconnect 508. A display subsystem 526 is connected to the high-speed interconnect 508 and includes conversion logic 528 and output logic 530 to allow operation with and connection to various video monitors if appropriate. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, USB block 540 and an Ethernet switch 542. A capture/MIPI module 544 includes a four-lane CSI-2 compliant transmit block 546 and a four-lane CSI-2 receive module and hub. Further details on the CSI-2 receive module and hub are provided below.

An MCU island 560 is provided as a secondary subsystem and handles operation of the integrated SoC 500 when the other components are powered down to save energy. An MCU ARM processor 562 operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568, an additional external communication interface, is connected to allow operation with a conventional CAN bus environment in the vehicle 100. An Ethernet MAC (media access control) block 570 is provided for further connectivity in the vehicle 100. Non-volatile memory (NVM) (not shown) is connected to the MCU ARM processor 562 through a NVRAM interface 571. The MCU ARM processor 562 operates as a safety processor, monitoring operations of the SoC 500 to ensure proper operation of the SoC 500.

In one example hardware versions of the snoop and copy blocks 550A, 550B are provided to cooperate with their related DSP 0 504A, DSP 1504B. Diagnostic memories D0 552A, D1 552B that cooperate with their related DSP 0 504A, DSP 1504B are provided at known locations in the L3 RAM 512. DSP 0 and DSP 1 frame buffers 554A, 554B are provided at known locations in the L3 RAM 512. Hardware checkers 505A and 505B are provided in one example and are discussed in more detail below.

It is understood that this is one example of an SoC provided for explanation and many other SoC examples are possible, with varying numbers of processors, DSPs, accelerators and the like.

Figure 6:
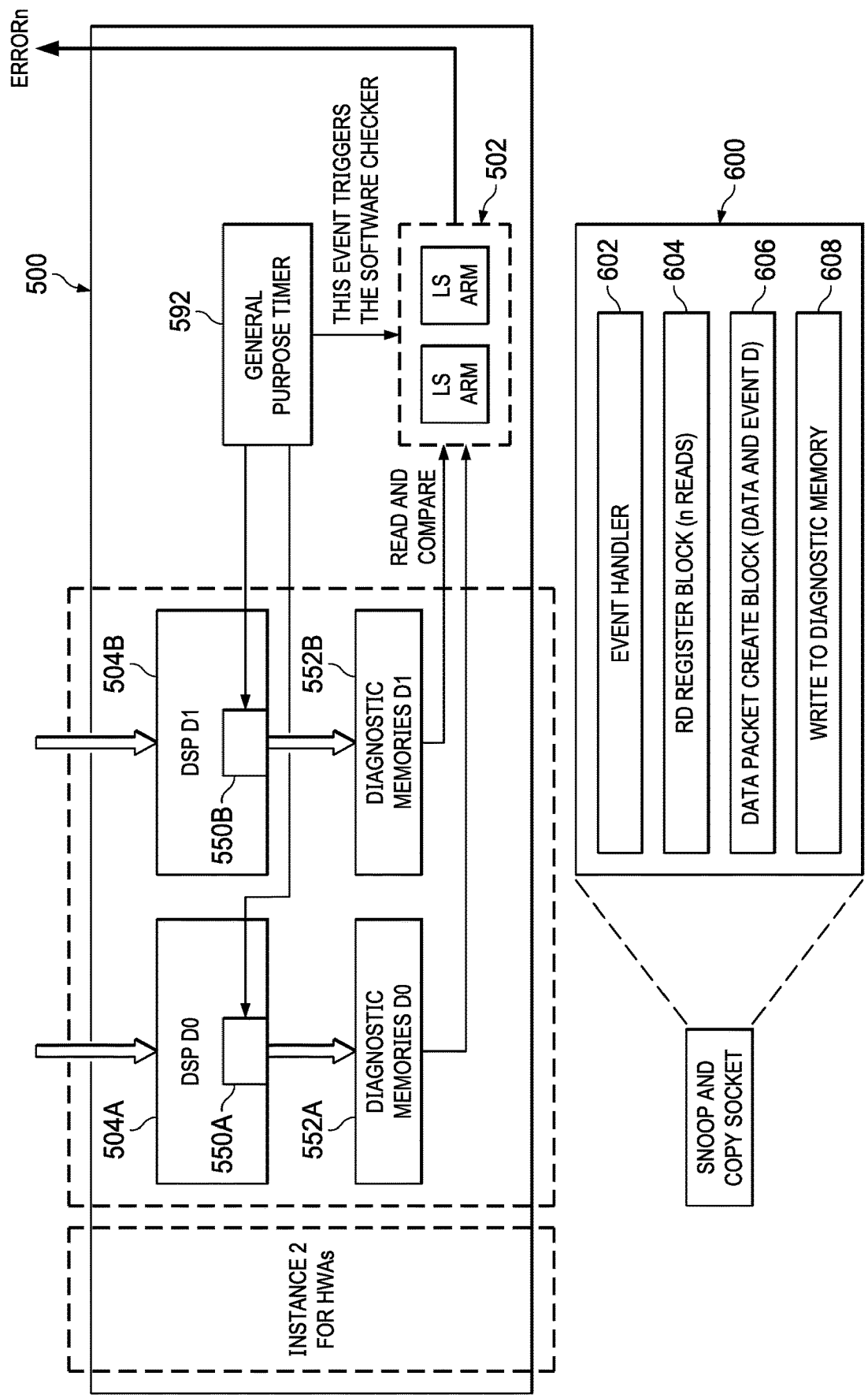
FIG. 6 is a block diagram of one example for obtaining comparison values of the SoC of FIGS. 4A and 5.

FIG. 6 provides a variation of FIG. 5, showing DSP D0 504A and DSP 504B. A common general purpose timer 592 is connected to the snoop and copy blocks 550A and 550B in each of the DSPs D0 504A, D1 504B. Upon triggering of the snoop and copy blocks 550A, 550B as shown in FIG. 5, the control register values, the frame data and timestamp are passed to the respective diagnostic memories D0 552A, D1 552B. The general purpose timer 592 also provides a trigger indication to the lockstep processors 502 to have the lockstep processors 502 read the diagnostic memories D0 552A and D1 552B and compare data in each diagnostic memory D0 552A, D1 552B to determine if the operation of the DSPs D0 504A, D1 504B is different beyond an acceptable amount or given level and, if so, provides an error interrupt or message.

In one example this diagnostic memory compare operation is triggered right after the snoop and copy blocks have completed transfer operations. In both these diagnostic memory comparisons and the frame and frame prediction operations described above, exact matching of all of the data is not required. While some areas, such as the control register data, should be identical, the frame data, especially any scratch memory values developed performing the frame operations, can vary by selected amounts and still be considered satisfactory. This "close enough" comparison is based on the fact that in many instances the vehicle 100 will be moving and so the images will be slightly different. In other cases, such as image streams from left and right forward pointing cameras, where the cameras are configured for skewed or slightly skewed viewing directions, if one DSP is processing the left image stream and the other DSP is processing the right image stream, the images will be different but still close enough for the comparisons and predictions to be sufficiently accurate for safety purposes. To accommodate the inter-frame vehicle movement or the view directions, some differences in the images are acceptable and do not indicate component failure requiring ASIL D intervention. It has been determined that if the images are within 5% in the various dimensions calculated for the images, such as distance and angle for the location of an object, the image is acceptable and a failure has not occurred. If the tolerance value is below 5%, the number of false positives increases, interfering with operations. A tolerance value above 5% can also be used, as generally the failures are complete and the differences are thus very high, but failures are not always complete, so a lower number is preferred. 5% has been determined to be a good balance between false positives and false negatives. In one example the acceptable difference or tolerance level is determined by developing a running variance value of the images and then setting the three-sigma value as the tolerance limit.

The example above used object distance and direction angle as the values checked for acceptable difference. Those are example variables and any target variables developed for the images can be used, such that the tolerance can be determined over multiple dimensions. These tolerances for the target variables can also be determined statistically through variance analysis for the computations over a certain number of prior time cycles.

FIG. 6 further illustrates the operation 600 of the snoop and copy blocks 550A, 550B. In a given snoop and copy operation, an event indication or handler indicating the trigger source, in some examples including the timestamp of the operation, for the snoop and copy operation is developed 602. The control register information is read 604. Following that, the data packet of the respective frame information is read 606. Finally, these developed and read values are written 608 to a diagnostic memory. Preferably a circular buffer pointer is incremented to allow multiple snapshots to be stored sequentially in the diagnostic memory. As the size of each snapshot in the diagnostic memory is known, this allows the hardware checker 505A, 505B or the lockstep processors 502 to simply find the relevant frames in the respective diagnostic memories by 552A, 552B for the two different DSPs.

The hardware version of the snoop and copy block 550A, 550B in one example is effectively a direct memory access (DMA) block, configured to gather control register information from the DSP D0 504A, D1 504B and move it to the diagnostic memory and to copy the frame information to the diagnostic memory, the diagnostic memory location being advanced with each operation using a circular buffer pointer.

In one example the software version of the snoop and copy block 550A, 550B is an interrupt-driven task of each DSP D0 504A, D1 504B. In the interrupt routine the DSP reads the desired control register information from the stack and reads the image information from the frame buffer and writes both to the diagnostic memory.

Figure 7:
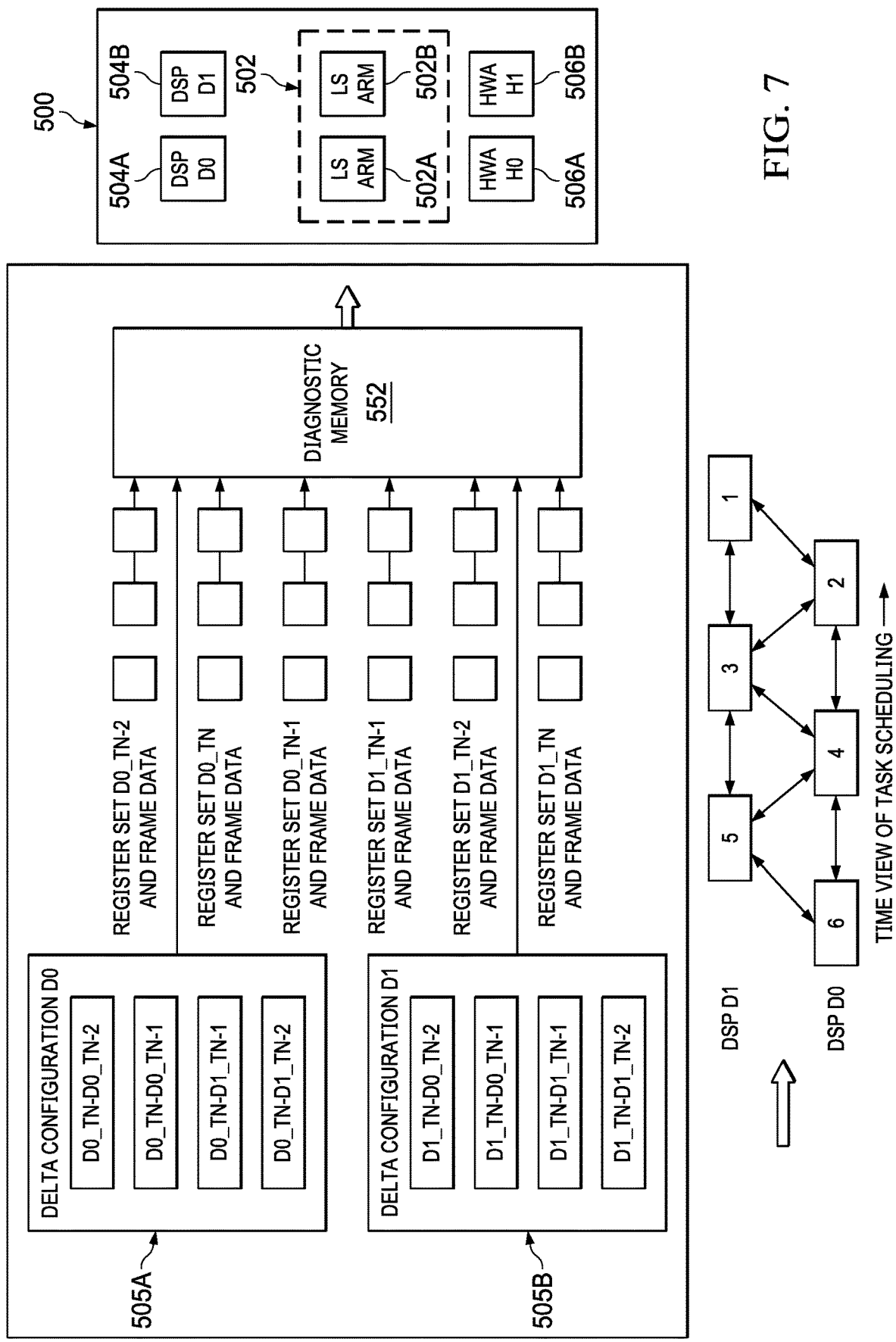
FIG. 7 is a block diagram of a second example for obtaining comparison values of the SoC of FIG. 4A.
Figure 8A:
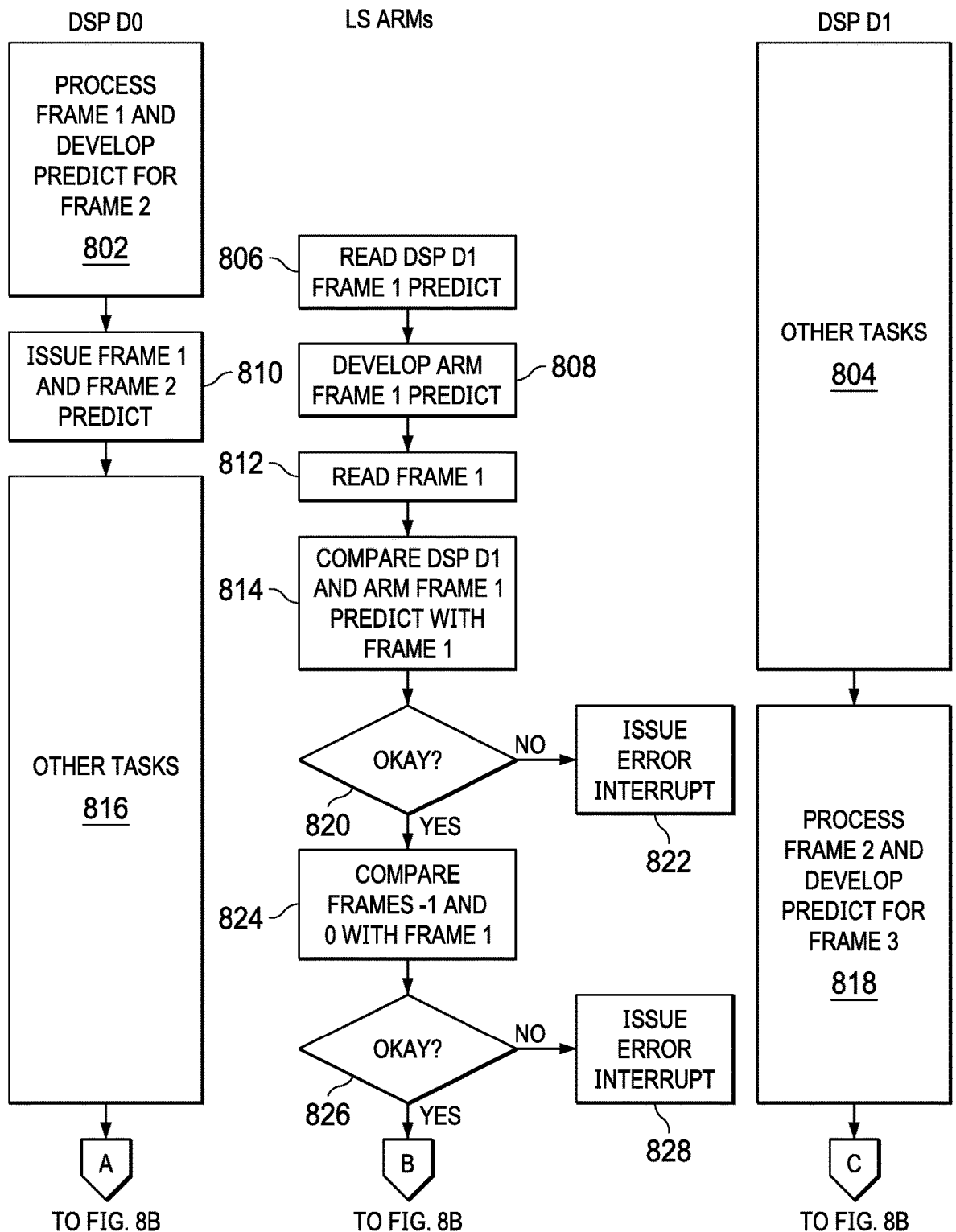
FIGS. 8A-8D are flowcharts illustrating the operations of the SoC of FIG. 4A according to FIG. 4B.
Figure 8B:
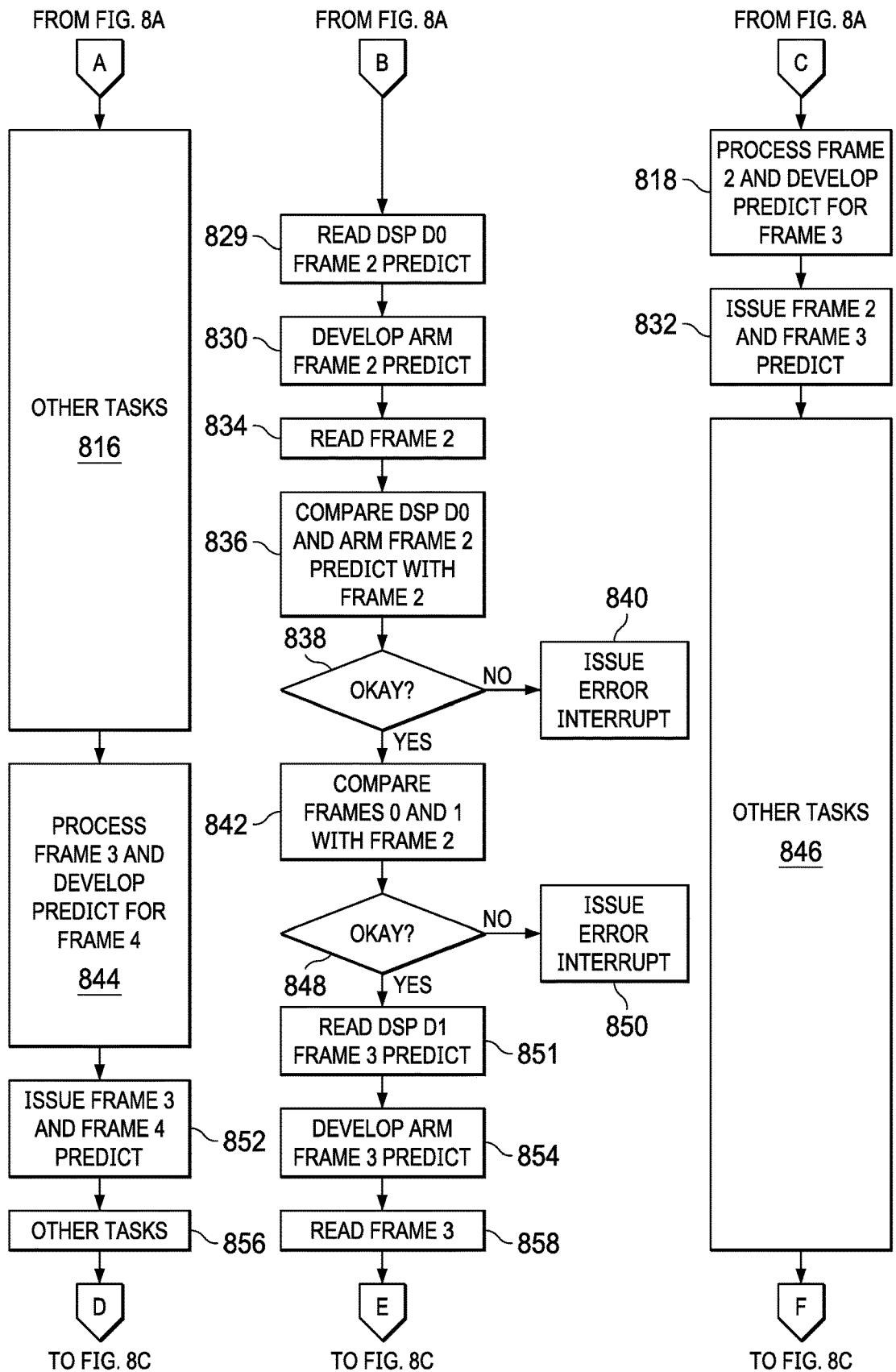
Figure 8C:
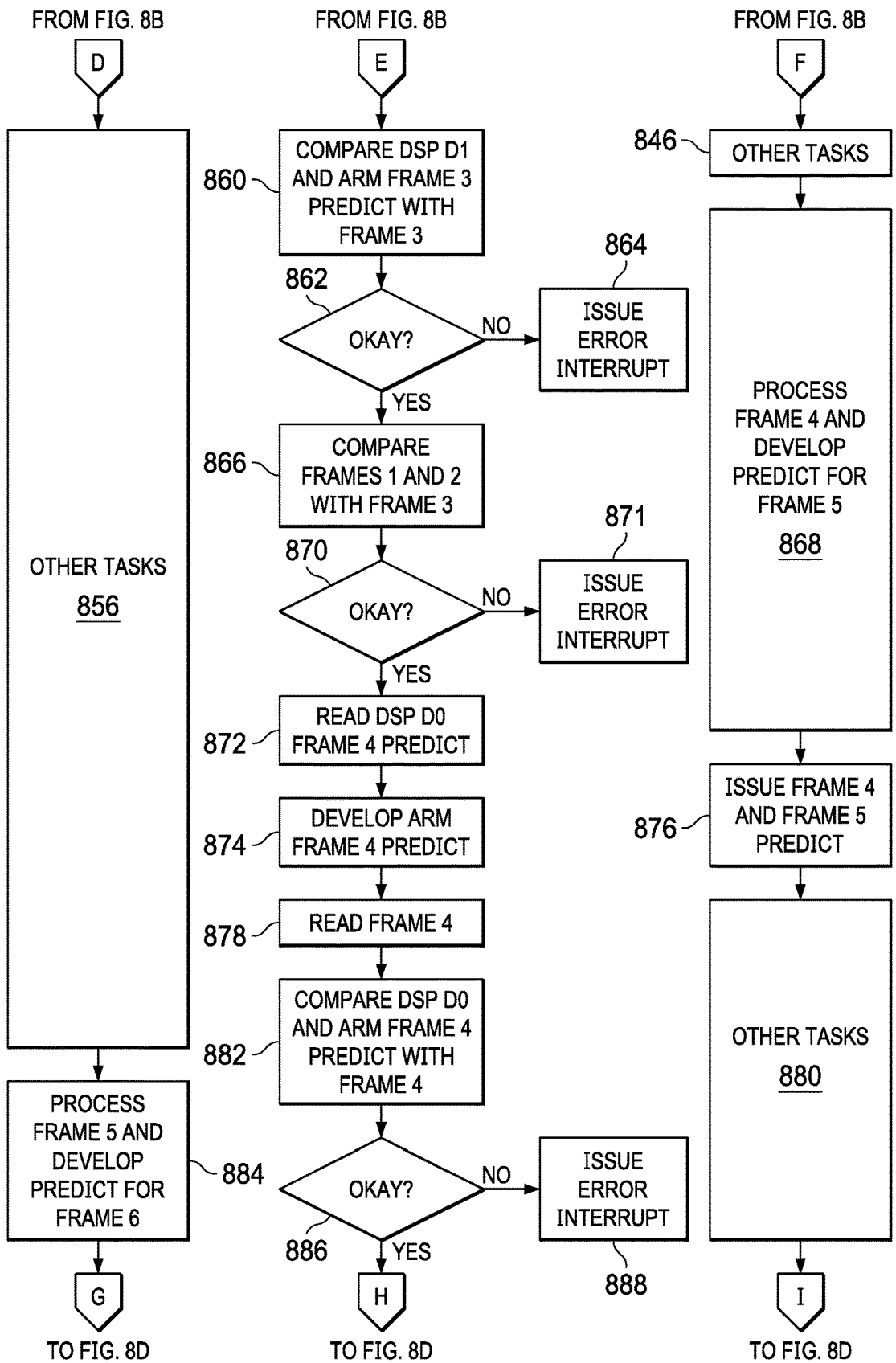
Figure 8D:
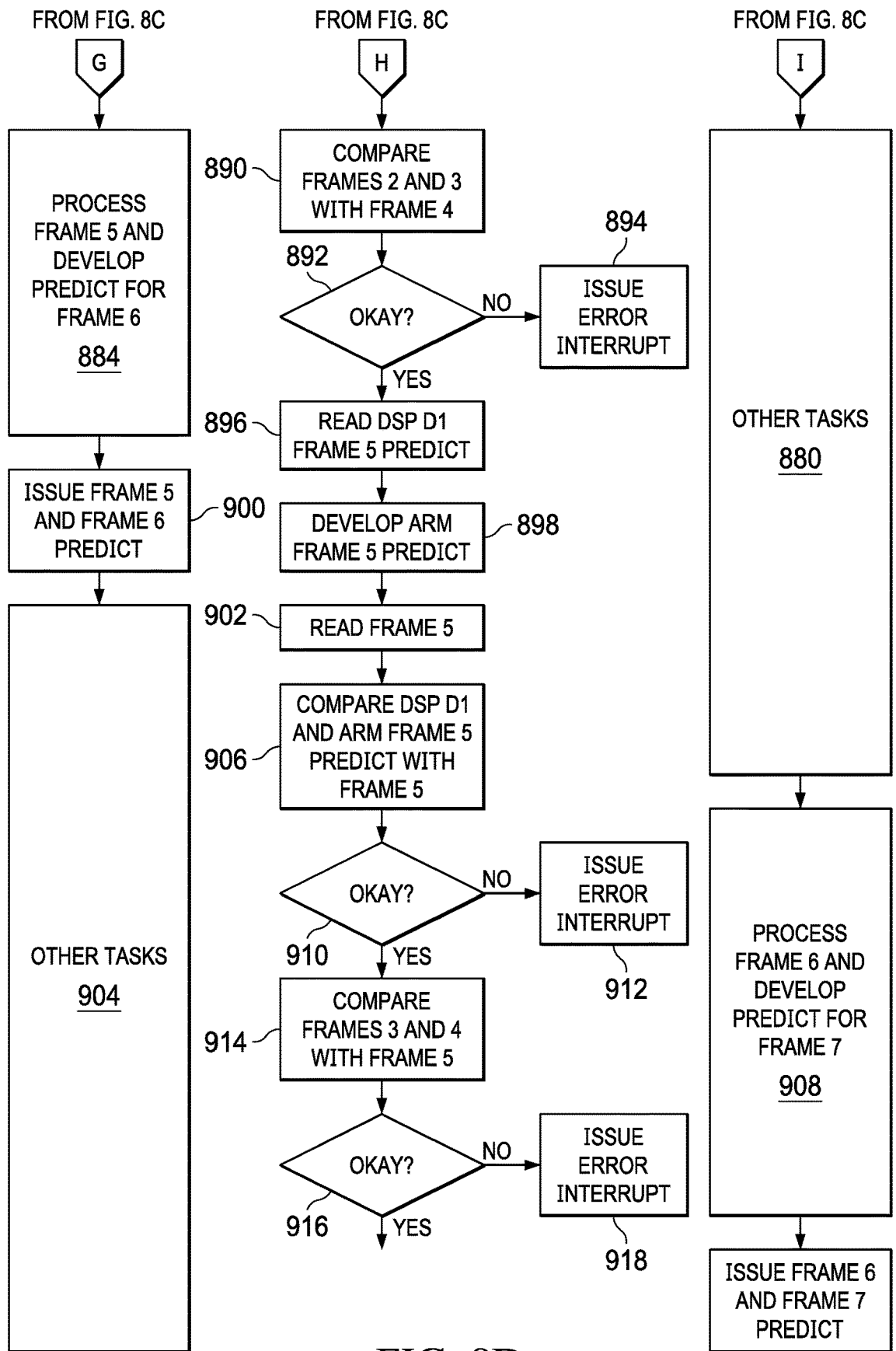
Figure 9A:
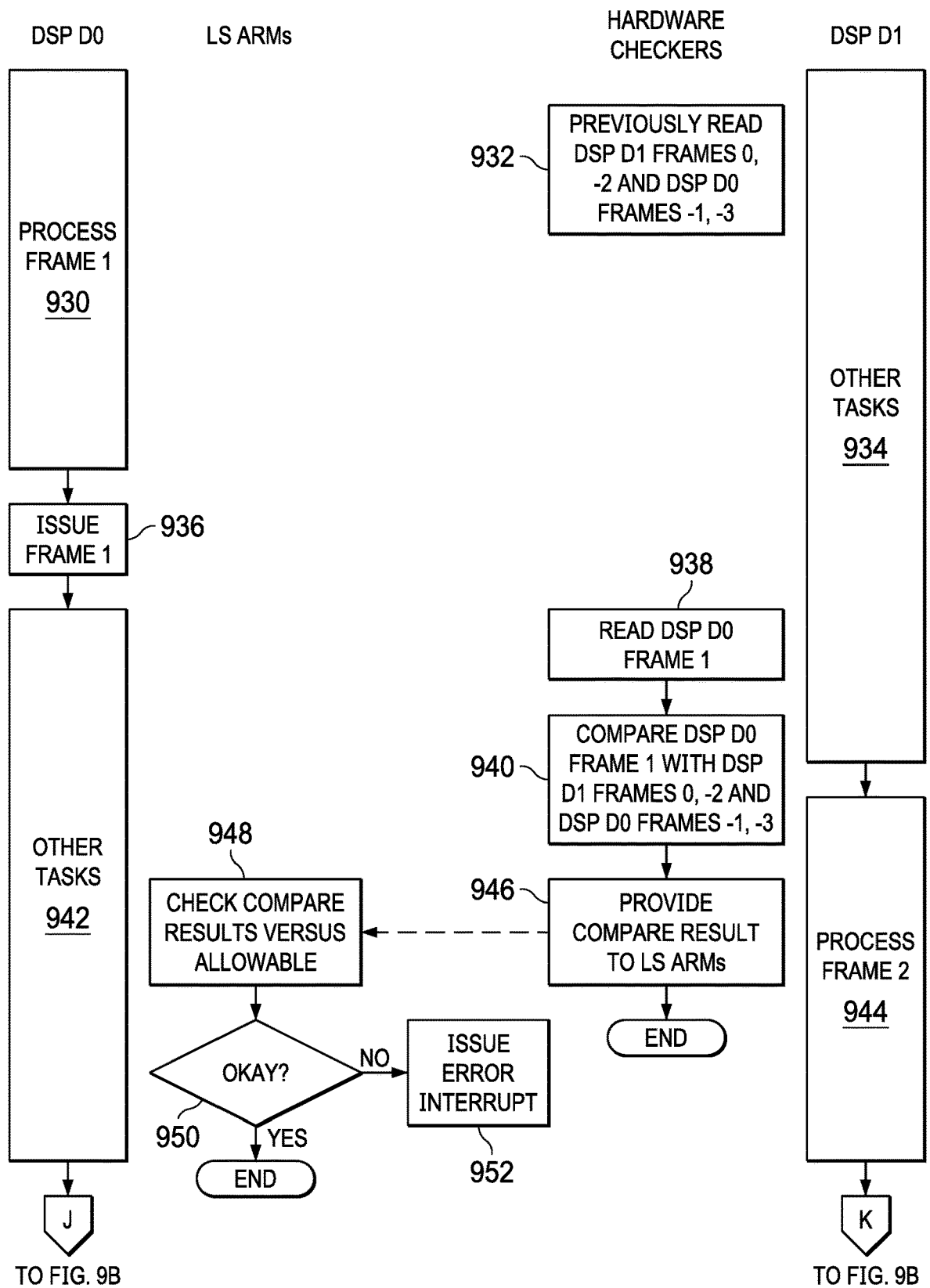
FIGS. 9A-9D are flowcharts illustrating the operations of the SoC of FIG. 4A according to FIG. 7.
Figure 9B:
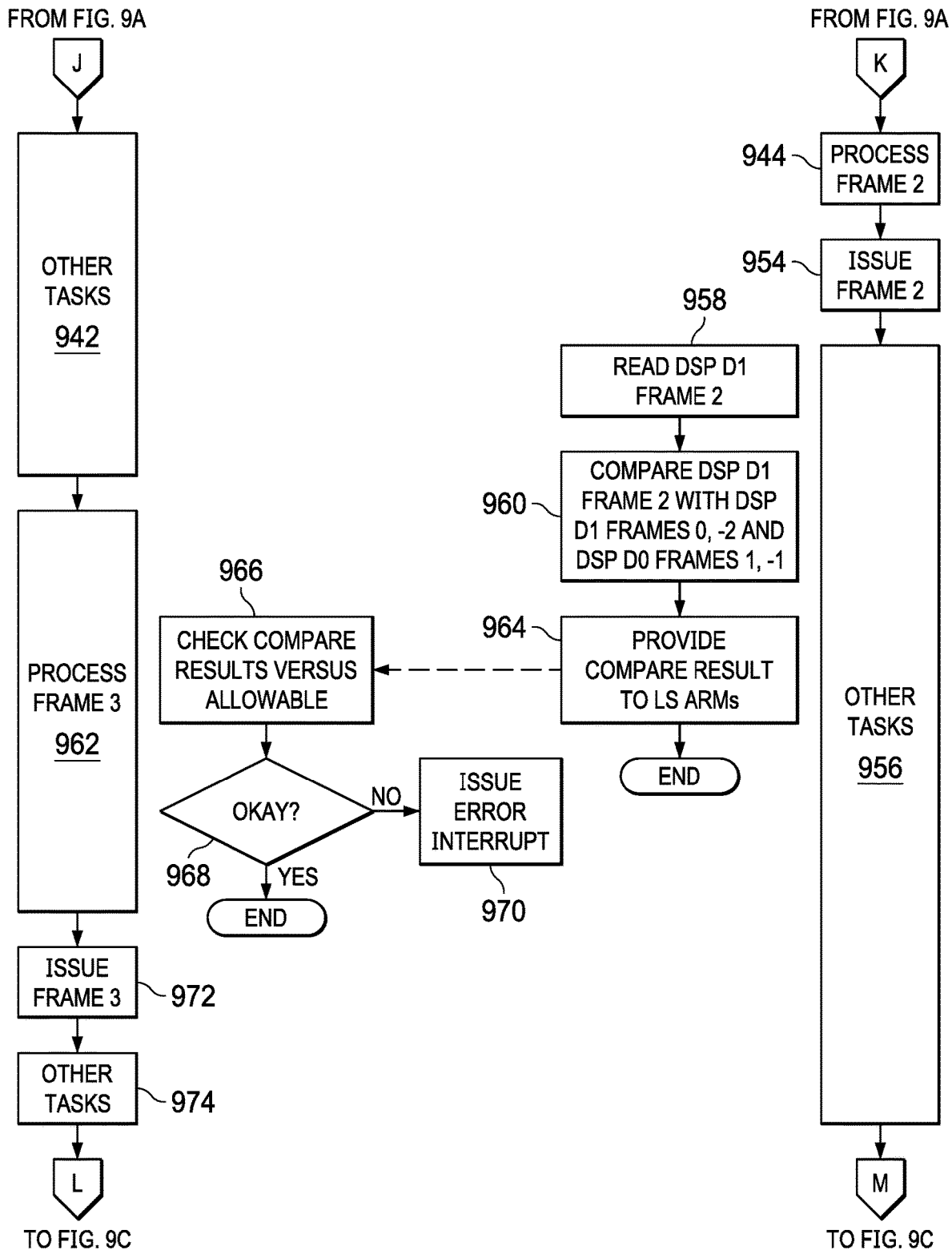
Figure 9C:
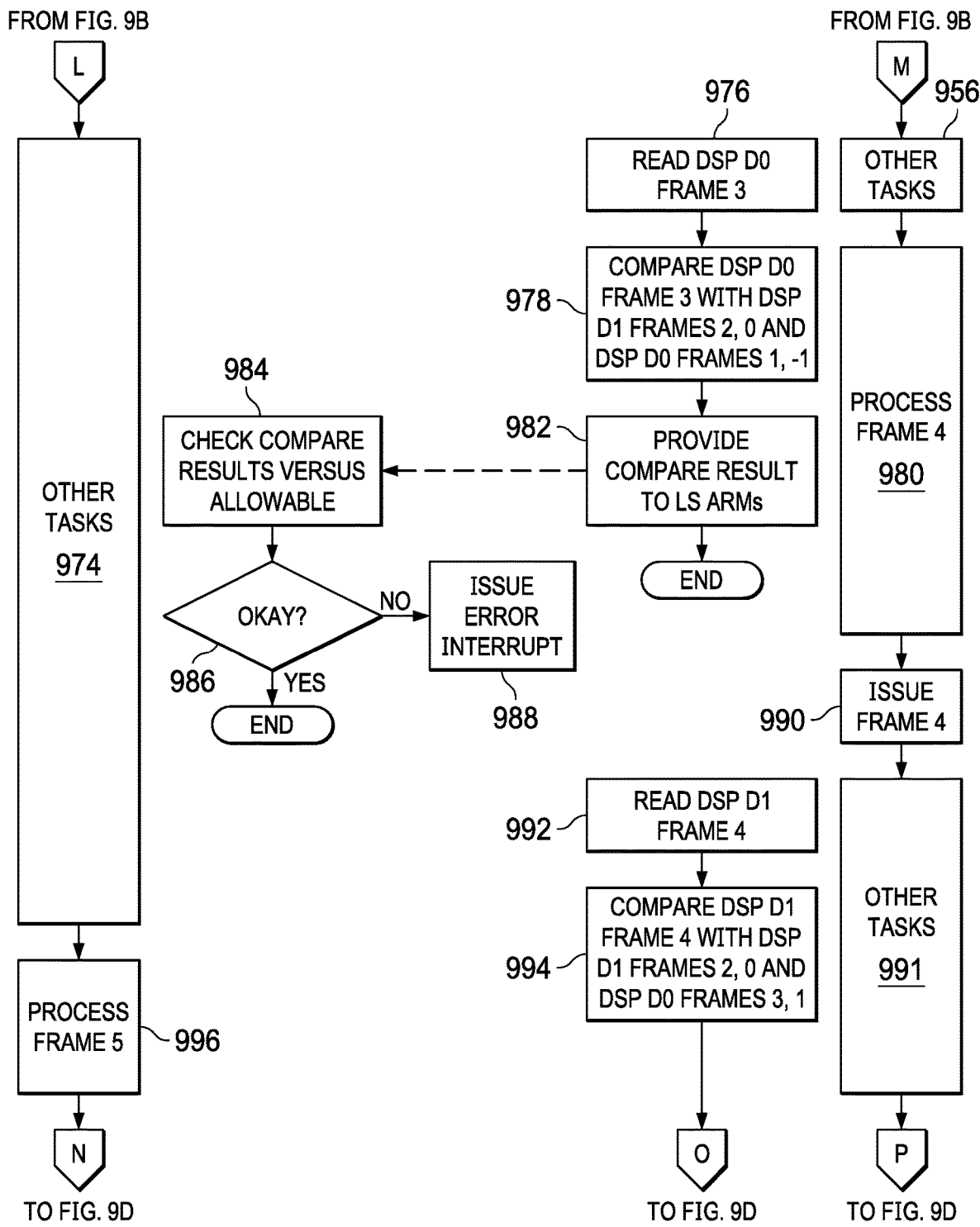
Figure 9D:
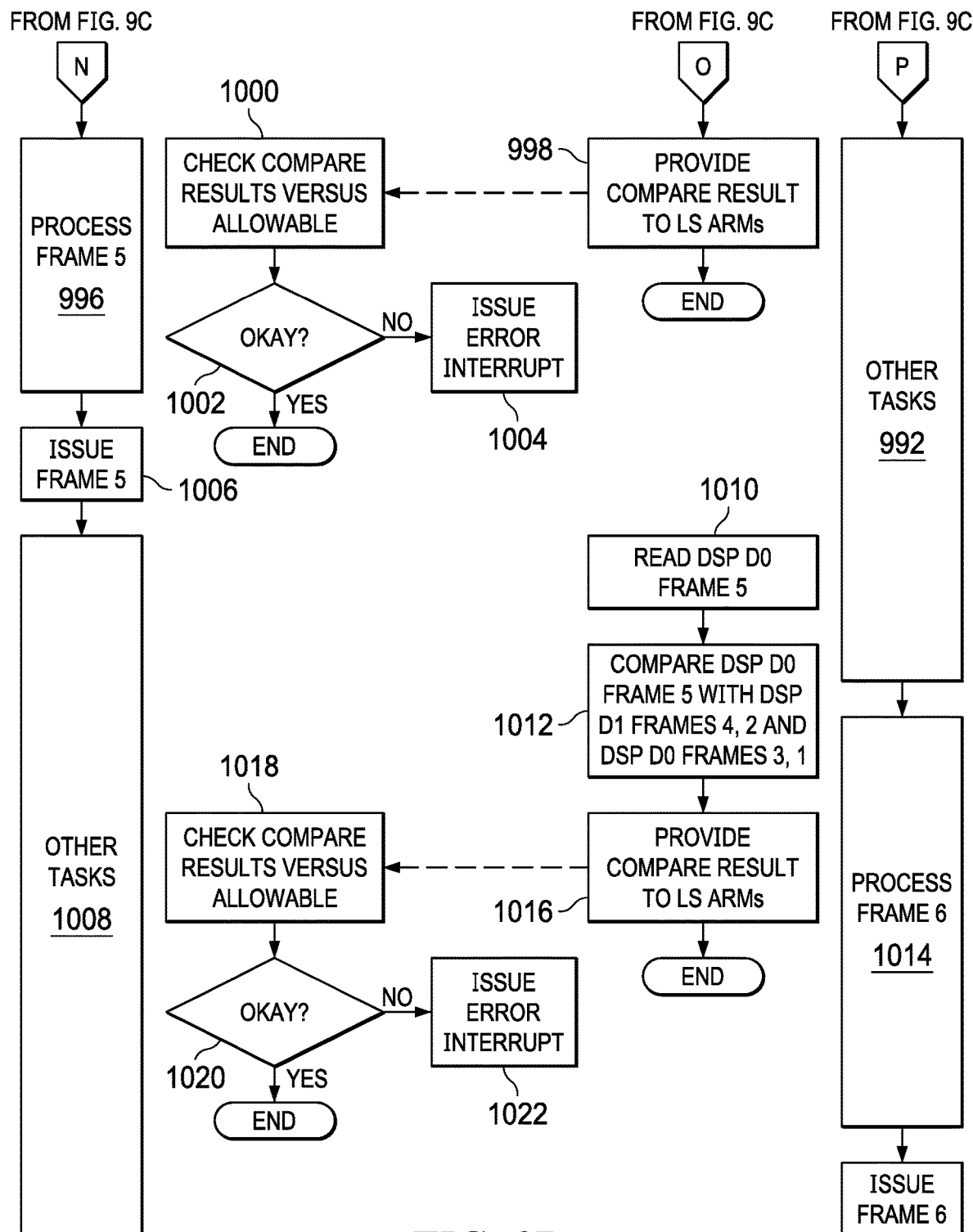

As shown in FIG. 7, preferably the diagnostic memories D0 552A, D1 552B contain data snapshots from various frames, such as frames 1, 3, 5 or 2, 4, 6, that is frames $T_N$, $T_{N-1}$ and $T_{N-2}$ from both DSP 1504B and DSP 0 504A. This allows the hardware checkers 505A, 505B and the lockstep processors 502 to perform checks using frames 1-5 or frames 2-6 to determine if the particular registers of interest or frame information have changed beyond an acceptable amount. If they have changed beyond the acceptable amount, the lockstep processors 502 provide an error indication. The hardware checkers 505A, 505B are triggered by the general purpose timer 592 instead of the general purpose timer 592 triggering the lockstep processors 502. The hardware checkers 505A, 505B providing comparison results to the lockstep processors 502 trigger the lockstep processors 502 to evaluate the comparison results.

As the snapshots are provided to known locations in the diagnostic memories D0 552A, D1 552B and the diagnostic memories D0 552A, D1 552B themselves are at known locations, the checking of the respective frames can be done by the hardware checkers 505A, 505B to relieve loading on the lockstep processors 502. In one example the hardware checker 505A, 505B contains a simple ALU to read the relevant frame and register values from the diagnostic memory 552 and compare the values. Assuming frame 6 is $T_N$, for example, hardware checker 0 505A reads in the frame and register data for frames 5 (D1_$T_{N-2}$), 3 (D1_$T_{N-1}$), 4 (D0_$T_{N-1}$), and 2 (D0_$T_{N-2}$) and does comparisons between frame 6 and each of those frames. The results of the comparisons are provided to the lockstep processors 502. The lockstep processors 502 then check the results against acceptable limits of difference. If the comparisons indicate differences beyond an acceptable level, the lockstep processors 502 provide an error indication. The use of the hardware checkers 505A, 505B lessens the processing required of the lockstep processors 502. While the comparisons done by the hardware checkers 505A, 505B do not include predicted values like the software checking done by the lockstep processors 502, the use of additional frames provides sufficient data to replace the predicted values.

Referring now to FIGS. 8A-8D, a flowchart of operations of DSP 0, DSP 1 and the lockstep processor without hardware checkers are illustrated in an approximate time relationship. In step 802, DSP 0 processes frame 1 and develops a prediction for frame 2. At the same time, DSP 1 in step 804 performs other non-frame processing tasks. In step 806, which is illustrated as slightly before the completion of frame processing in step 802 by DSP 0, the lockstep processor reads the DSP 1 frame 1 prediction from the diagnostic memory and develops its own frame 1 prediction in step 808. In step 810, DSP 0 issues frame 1 and the frame 2 prediction. This issuing of frame 1 and frame 2 prediction includes the snoop and copy block copying the frames to the diagnostic memory, as well as the DSP register values if those are being stored. All such issuance of frames is assumed to include the snoop and copy block operation, which is hereafter omitted for clarity. After frame 1 has been issued, in step 812 the lockstep processor reads frame 1 from the diagnostic memory and in step 814 compares the DSP 1 and lockstep processor frame predictions with actual frame 1. At this time, in step 816, DSP 0 has proceeded to other non-frame processing tasks. Also, at this time, in step 818, DSP 1 is commencing processing frame 2 and developing the prediction for frame 3. After the comparison of step 814, the lockstep processor evaluates or determines in step 820 if the comparison result indicates that the actual frame 1 was sufficiently close to the predicted frame 1. If not, in step 822 an error interrupt is issued so that higher level processing can evaluate the ASIL D concerns. If the comparison is successful, in step 824 the lockstep processor compares the prior two frames, frame 0 and frame −1, with frame 1. If the frames are not within acceptable bounds of differences as in step 826, in step 828 an error interrupt is issued.

If the comparison is successful, in step 829 the DSP 0 frame 2 prediction is read and then in step 830 the lockstep processor develops a frame 2 prediction. At this time, in step 832 DSP 1 has issued frame 2 and the frame 3 prediction. The lockstep processor in step 834 reads frame 2 and in step 836 compares the DSP 0 and lockstep processor frame 2 predictions with actual frame 2. If the differences are beyond acceptable limits as determined in step 838, in step 840 an error interrupt is issued. If the differences are within acceptable limits, operation proceeds to step 842 to compare frames 0 and 1 with frame 2. At this time, in step 844, DSP 0 has commenced processing frame 3 and developing the prediction for frame 4. DSP 1 is well into other processing tasks in step 846. If it is determined in step 848 that the three frame comparison is unacceptable, in step 850 an error is issued. If acceptable, in step 851 the lockstep processor reads the DSP 1 frame 3 prediction that was issued in step 832. In step 852, DSP 0 issues frame 3 and the frame 4 prediction. In step 854, the lockstep processor develops its frame prediction for frame 3. The DSP 0 begins performing other tasks in step 856 and the lockstep processor reads frame 3 in step 858.

In step 860, the lockstep processor compares the DSP 1 and lockstep processor frame 3 predictions with actual frame 3. If outside of acceptable limits as determined in step 862, an error interrupt is issued in step 864. If acceptable, in step 866 the lockstep processor compares frames 1, 2 and 3. At this time, DSP 1 is processing frame 4 and developing the prediction for frame 5 in step 868. The lockstep processor determines in step 870 if the three frame comparison was acceptable. If not, in step 871 an error interrupt is issued. If acceptable, in step 872 the lockstep processor reads the DSP 0 frame 4 prediction and in step 874 the lockstep processor performs its own frame 4 prediction. At this time, DSP 1 in step 876 issues frame 4 and the frame 5 prediction. This allows the lockstep processor to read frame 4 in step 878. DSP 1 proceeds to other tasks besides frame processing in step 880. In step 882 the lockstep processor compares the DSP 0 and lockstep processor frame 4 predictions with actual frame 4. In step 884, DSP 0 begins processing frame 5 and developing the prediction for frame 6. If the comparison of step 882 indicates an unacceptable difference as determined in step 886, in step 888 an error interrupt is issued.

If the differences were within acceptable limits in step 886, in step 890 the lockstep processor compares frames 2 and 3 with frame 4. If the frames are too different as determined in step 892, an error interrupt is issued in step 894. If the frames are sufficiently close, in step 896 the lockstep processor reads the DSP 1 frame 5 prediction and in step 898 develops its own frame 5 prediction. At this time, in step 900 DSP 0 has completed frame processing and issues frame 5 and a frame 6 prediction. The lockstep processor in step 902 reads frame 5 at basically the same time as DSP 0 precedes to other tasks in step 904. In step 906, the lockstep processor compares the DSP 1 and ARM frame 5 predictions with actual frame 5. At approximately this time, DSP 1 in step 908 begins processing frame 6 and developing the prediction for frame 7. In step 910 the lockstep processor determines if the comparison of step 906 was unacceptable. If unacceptable, an error interrupt is issued in step 912. If acceptable, in step 914 the lockstep processor compares frames 3, 4 and 5. In step 916 the lockstep processor determines if the error was unacceptable, in which case an error interrupt is issued in step 918.

Frame processing continues in like manner until no longer needed.

As seen in FIGS. 8A-8D, the DSPs can spend significant amounts of time performing other tasks rather than performing lockstep frame processing. This allows an increase in the performance of the SOC for the given DSP or the use of DSPs that are less powerful while maintaining safety at the ASIL D level.

While the above description has had frame predictions performed by both the DSPs and the lockstep processors, in one example only one of the DSPs and the lockstep processors develops the frame predictions, freeing some bandwidth in either the lockstep processors or the DSPs.

FIGS. 9A-9D are a flowchart of operations of DSP 0, DSP 1, the lockstep processor and the hardware checkers are illustrated in an approximate time relationship. In step 930, DSP 0 processes frame 1. In step 932 the hardware checkers will have previously read DSP 1 frames 0, −2 and DSP 0 frames −1, −3. At the same time as step 930, DSP 1 in step 934 performs other non-frame processing tasks. In step 936, DSP 0 issues frame 1. After frame 1 has been issued, in step 938, based on the general purpose timer 592, the hardware checker reads frame 1 and in step 940 compares the DSP 0 frame 1 with DSP 1 frames 0, −2 and DSP 0 frames −1, −3. At this time, in step 942, DSP 0 has proceeded to other non-frame processing tasks. Also, at this time, in step 944, DSP 1 is commencing processing frame 2. After the comparison of step 940, in step 946 the hardware checker provides the comparison results to the lockstep processor. In step 948, the lockstep processor evaluates or checks the comparison results versus allowable deviation limits. In step 950, the lockstep processor determines if the comparison results are within acceptable limits. If not, in step 952 an error interrupt is issued so that higher level processing can evaluate the ASIL D concerns. If the comparison is successful, this operation terminates in the lockstep processor until the next comparison results are received from the hardware checker.

DSP 1 finishes processing frame 2 and in step 954 issues frame 2 and in step 956 proceeds to other tasks. After frame 2 has been issued, in step 958, the hardware checker reads frame 2 and in step 960 compares the DSP 1 frame 2 with DSP 1 frames 0, −2 and DSP 0 frames 1, −1. At this time, in step 962, DSP 0 is commencing processing frame 3. After the comparison of step 960, in step 964 the hardware checker provides the comparison results to the lockstep processor. In step 966, the lockstep processor checks the comparison results versus allowable deviation limits. In step 968, the lockstep processor determines if the comparison results are within acceptable limits. If not, in step 970 an error interrupt is issued so that higher level processing can evaluate the ASIL D concerns. If the comparison is successful, this operation terminates in the lockstep processor until the next comparison results are received from the hardware checker.

In step 972, DSP 0 issues frame 3 and in step 974 proceeds to other tasks. After frame 3 has been issued, in step 976, the hardware checker reads frame 3 and in step 978 compares the DSP 0 frame 3 with DSP 1 frames 2, 0 and DSP 0 frames 1, −1. At this time, in step 980, DSP 1 is commencing processing frame 4. After the comparison of step 978, in step 982 the hardware checker provides the comparison results to the lockstep processor. In step 984, the lockstep processor checks the comparison results versus allowable deviation limits. In step 986, the lockstep processor determines if the comparison results are within acceptable limits. If not, in step 988 an error interrupt is issued so that higher level processing can evaluate the ASIL D concerns. If the comparison is successful, this operation terminates in the lockstep processor until the next comparison results are received from the hardware checker.

In step 990, DSP 1 issues frame 4 and in step 991 proceeds to other tasks. After frame 4 has been issued, in step 992, the hardware checker reads frame 4 and in step 994 compares the DSP 1 frame 4 with DSP 1 frames 2, 0 and DSP 0 frames 3, 1. At this time, in step 996, DSP 0 is commencing processing frame 5. After the comparison of step 994, in step 998 the hardware checker provides the comparison results to the lockstep processor. In step 1000, the lockstep processor checks the comparison results versus allowable deviation limits. In step 1002, the lockstep processor determines if the comparison results are within acceptable limits. If not, in step 1004 an error interrupt is issued so that higher level processing can evaluate the ASIL D concerns. If the comparison is successful, this operation terminates in the lockstep processor until the next comparison results are received from the hardware checker.

In step 1006, DSP 0 issues frame 5 and in step 1008 proceeds to other tasks. After frame 5 has been issued, in step low, the hardware checker reads frame 5 and in step 1012 compares the DSP 0 frame 5 with DSP 1 frames 4, 2 and DSP 0 frames 3, 1. At this time, in step 1014, DSP 1 is commencing processing frame 6. After the comparison of step 1012, in step 1016 the hardware checker provides the comparison results to the lockstep processor. In step 1018, the lockstep processor checks the comparison results versus allowable deviation limits. In step 1020, the lockstep processor determines if the comparison results are within acceptable limits. If not, in step 1022 an error interrupt is issued so that higher level processing can evaluate the ASIL D concerns. If the comparison is successful, this operation terminates in the lockstep processor until the next comparison results are received from the hardware checker.

Frame processing continues in like manner until complete.

FIGS. 9A-9D, like FIGS. 8A-8D, illustrate that the DSPs can spend significant amounts of time performing other tasks rather than performing lockstep frame processing. Further, the lockstep processors also have a reduced load and so can devote more of their time to other tasks. This allows an increase in the performance of the image processing system of the SoC for a given DSP and lockstep processor or the use of DSPs and lockstep processors that are less powerful while maintaining safety at the ASIL D level.

While descriptions of FIGS. 8A-8D and 9A-9D describe comparing frames and predicted frames, if the example is also storing DSP register values for each frame, the comparisons include comparing the DSP register values.

As described above, various elements are used to determine if processed frames are acceptable or a reportable error has occurred. These elements include frame predictions by the DSPs and lockstep processors, prior processed frames and DSP register values. All of these elements are considered alternative frame information as each provides indications of what the data for the next frame should be close to if the next frame is not in error. The frame predictions and prior processed frames are alternative frame versions, while the DSP register values are alternative information about the frame, information relating to the development of the frames or alternative frame versions. So, alternative frame information covers all three items, the frame predictions, the prior processed frames and the DSP register values.

The above description has focused on describing operation using a single image stream, with the different DSPs then handling even and odd frames. If two related image streams are being processed and the image streams are sufficiently related or overlapped, in one example each DSP can process a separate image stream, each DSP then processing each image in the assigned stream, so that again the DSPs are operating on different frames and do not operate on the same frame. For example, if the image streams are a right and left pair, one DSP processes the right stream and one DSP processes the left stream, but comparisons, and predictions if done, are done against both streams. In another example, in the two image stream case, one DSP can process the even images from each image stream and the other DSP can process the odd images from each image stream. In this example, the predictions if done, and comparisons are made on the frames of the same image stream, rather than frames of the other image stream. Thus, the first DSP would process image stream 1, frame 1 and predict frame 2 and next the first DSP would process image stream 2 frame 1 and predict frame 2.

The above description has included register values in the DSPs in the comparison operations for added information for detecting error conditions. In some examples the register values are not utilized, and the snoop and copy blocks only copy frame data to the diagnostic memories.

The above description and the flowcharts of FIGS. 8A-8D and 9A-9D have shown an error being indicated on a single frame being different beyond acceptable limits. In one design, instead of a single frame being used, three successive frames failing is used. If a first frame fails, it is discarded and the next frame is compared to the references used for the first frame. If this second frame also fails, it is also discarded, and the next frame is compared. If this third frame then also fails, then the error indication is provided. This provides a simple filtering action to avoid single transient errors from causing an error condition.

While the above description has focused on image processing, other streams can be processed in a similar manner. For example, radar signal processing, lidar signal processing and object level sensor fusion processing can all be done similarly and achieve a similar improvement in available DSP processing bandwidth. Tolerance determinations are based on the target variables developed for the relevant streams.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An image processing system for use with at least one image stream, the image processing system comprising:
   a first digital signal processor (DSP) for receiving frames of the at least one image stream;
   a second DSP for receiving frames of the at least one image stream, the first DSP and the second DSP for receiving different frames of the at least one image stream;
   a data memory coupled to, and shared by, each of the first and second DSPs for storing frames processed by the first and second DSPs;
   a pair of processors configured to operate in lockstep, the pair of processors coupled to the data memory;
   a DSP program memory coupled to the first and second DSPs and storing instructions to cause the respective DSP to:

process received frames of the respective at least one image stream; and a lockstep program memory coupled to the pair of processors and storing instructions to cause the pair of processors to:
evaluate, for each frame processed by the first DSP and the second DSP, the processed frame against alternative frame information to determine if the processed frame differs from the alternative frame information more than a given level; and
provide an error indication if the differences are above the given level.

2. The image processing system of claim 1, wherein the at least one image stream is a single image stream and the first and second DSPs receive alternating frames of the single image stream.

3. The image processing system of claim 1, wherein the at least one image stream is two related image streams, the first DSP for receiving frames of one related image stream and the second DSP for receiving frames of the other related image stream.

4. The image processing system of claim 1, wherein the alternative frame information includes frame predictions developed by at least one of the first or second DSP and the pair of processors.

5. The image processing system of claim 4, wherein the frame predictions are developed by both the first or second DSP and the pair of processors.

6. The image processing system of claim 4, wherein the alternative frame information further includes prior processed frames of the at least one image stream.

7. The image processing system of claim 1, wherein the alternative frame information includes prior processed frames of the at least one image stream.

8. The image processing system of claim 1, wherein the alternative frame information includes register values of the first and second DSPs.

9. The image processing system of claim 1, further comprising:
a snoop and copy block for each of the first and second DSPs, each snoop and copy block coupled to a respective of the first and second DSPs and the data memory, the snoop and copy block for copying processed frames for use by the pair of processors during the evaluation of the processed frames.

10. The image processing system of claim 9, wherein the snoop and copy block is coupled to the DSP program memory and includes instructions stored in the DSP program memory to cause the respective first or second DSP to copy processed frames for use by the pair of processors during the evaluation of the processed frames.

11. The image processing system of claim 9, wherein the snoop and copy block is a hardware block for copying the processed frames for use by the pair of processors during the evaluation of the processed frames.

12. The image processing system of claim 9, wherein the snoop and copy block further is for copying register values in the respective first or second DSP to the data memory for use by the pair of processors during the evaluation of the processed frames.

13. The image processing system of claim 1, wherein alternative frame information includes prior processed frames of the at least one image stream, the image processing system further comprising:
a hardware checker for each of the first and second DSPs, each hardware checker coupled to the pair of processors and to the data memory, wherein each hardware checker is adapted to compare, for each processed frame, the processed frame and prior processed frames of the at least one image stream and provide a comparison result to the pair of processors to be evaluated to determine if the processed frame differs from the alternative frame information more than a given level.

14. The image processing system of claim 1, wherein the lockstep program memory further stores instructions to cause the pair of processors to:
compare, for each frame processed by the first DSP and the second DSP, the processed frame against alternative frame information to develop a comparison result to be evaluated.

15. The image processing system of claim 14, wherein the lockstep program memory further stores instructions to cause the pair of processors to:
develop, for each frame processed by the first DSP and the second DSP, a predicted next frame to include in the alternative frame information used to compare.

16. An image processing system for use with an image stream having even and odd frames, the image processing system comprising:
a first DSP for receiving the even frames of the image stream;
a second DSP for receiving the odd frames of the image stream;
a data memory coupled to the first and second DSPs for storing frames processed by the first and second DSPs;
a pair of processors configured to operate in lockstep, the pair of processors coupled to the data memory;
a DSP program memory coupled to the first and second DSPs and storing instructions to cause the respective DSP to:
process a respective one of the even and odd frames of the image stream;
predict the next frame in the other of the even and odd frames of the image stream; and
store such processed frame and DSP predicted next frame in the data memory; and
a lockstep program memory coupled to the pair of processors and storing instructions to cause the pair of processors to:
for a given odd or even frame of the image stream, develop a lockstep predicted next frame for the next even or odd frame;
read the next processed frame from the data memory;
read the DSP predicted next frame corresponding to the next processed frame from the data memory;
compare the lockstep predicted next frame, the DSP predicted next frame and the next processed frame to determine if differences between the predicted next frames and the next processed frame are above a given level; and
provide an error indication if the differences between the predicted next frames and the next processed frame are above the given level.

17. The image processing system of claim 16, wherein the lockstep program memory further stores instructions to cause the pair of processors to:
compare the next processed frame with the prior two processed frames to determine if differences between the prior two processed frames and the next processed frame are above a given level; and
provide an error indication if the differences between the prior two processed frames and the next processed frame are above the given level.

18. The image processing system of claim 16, further comprising:
a snoop and copy block for each of the first and second DSPs, each snoop and copy block coupled to a respective of the first and second DSPs and the data memory, the snoop and copy block for copying processed frames and predicted next frames and values of selected registers in the DSP for use by the pair of processors during the comparison of the next processed frames.

19. An image processing system for use with an image stream having even and odd frames, the image processing system comprising:
a first DSP for receiving the even frames of the image stream;
a second DSP for receiving the odd frames of the image stream;
a data memory coupled to the first and second DSPs for storing frames processed by the first and second DSPs;
a pair of processors configured to operate in lockstep, the pair of processors coupled to the data memory;
a DSP program memory coupled to the first and second DSPs and storing instructions to cause the respective DSP to:
process a respective of the even and odd frames of the image stream; and
store such processed frame in the data memory;
a hardware checker for each of the first and second DSPs, each hardware checker coupled to the pair of processors and to the data memory, wherein each hardware checker is adapted to compare, for each processed frame, the processed frame and prior processed frames of the image stream and provide a comparison result to the pair of processors to be evaluated to determine if the processed frame differs from prior processed frames more than a given level; and
a lockstep program memory coupled to the pair of processors and storing instructions to cause the pair of processors to:
evaluate, for each frame processed by the first DSP and the second DSP, the processed frame against prior processed frames to determine if the processed frame differs from the prior processed frames more than a given level; and
provide an error indication if the differences between the processed frame and the prior processed frames are above the given level.

20. The image processing system of claim 19, further comprising:
a snoop and copy block for each of the first and second DSPs, each snoop and copy block coupled to a respective of the first and second DSPs and the data memory, the snoop and copy block for copying processed frames and values of selected registers in the DSP for use by the pair of processors during the evaluation of the processed frames.

\* \* \* \* \*